United States Patent
Uchida et al.

(10) Patent No.: US 7,072,359 B2
(45) Date of Patent: Jul. 4, 2006

(54) SHORT MESSAGE CONVERSION BETWEEN DIFFERENT FORMATS FOR WIRELESS COMMUNICATION SYSTEMS

(75) Inventors: Nobuyuki Uchida, San Diego, CA (US); Hai Qu, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 352 days.

(21) Appl. No.: 10/192,134

(22) Filed: Jul. 9, 2002

(65) Prior Publication Data
US 2004/0008723 A1  Jan. 15, 2004

(51) Int. Cl.
*H04J 3/22* (2006.01)
(52) U.S. Cl. .................................. 370/466
(58) Field of Classification Search ............... 370/328, 370/335, 336, 342, 347, 441, 442, 465, 466, 370/469
See application file for complete search history.

(56) References Cited

U.S. PATENT DOCUMENTS

| | | | |
|---|---|---|---|
| 6,175,743 B1 * | 1/2001 | Alperovich et al. | 455/466 |
| 2002/0173320 A1 * | 11/2002 | Aitken et al. | 455/466 |
| 2003/0003930 A1 * | 1/2003 | Allison et al. | 455/466 |
| 2003/0224811 A1 * | 12/2003 | Jain et al. | 455/466 |
| 2004/0008656 A1 * | 1/2004 | Qu et al. | 370/342 |

FOREIGN PATENT DOCUMENTS

| | | |
|---|---|---|
| WO | 00/56110 | 9/2000 |
| WO | 02/33985 A2 | 4/2002 |

* cited by examiner

*Primary Examiner*—Chi Pham
*Assistant Examiner*—Anh-Vu Ly
(74) *Attorney, Agent, or Firm*—Philip Wadsworth; Sandra L. Godsey; Kent D. Baker (57) ABSTRACT

Techniques for converting short messages between different formats (e.g., from GSM SMS to CDMA SMS) such that pertinent control information is retained without changing the fundamental structure of these message formats. A new value is defined for the Msg_Encoding field in the User Data subparameter of the CDMA SMS message to indicate that the content of this message is an encapsulated GSM SMS message. The Message_Type field in the User Data subparameter may be used to carry data coding scheme information for the encapsulated GSM SMS message. At a recipient mobile station, the value in the Msg_Encoding field is checked to determine whether or not the CDMA SMS message includes an encapsulated GSM SMS message. If the answer is yes, then the user data in the CHARi fields of the CDMA SMS message is processed based on the data coding scheme information from the Message_Type field.

11 Claims, 6 Drawing Sheets

SHORT MESSAGE CONVERSION BETWEEN DIFFERENT FORMATS FOR WIRELESS COMMUNICATION SYSTEMS

BACKGROUND

1. Field

The present invention relates generally to wireless messaging communication, and more specifically to techniques for converting short messages between different formats used by different wireless communication systems (e.g., GSM and CDMA).

2. Background

Short Message Service (SMS) is a service that supports the exchange of SMS or short messages between mobile stations and a wireless communication system. These short messages may be user-specific messages intended for specific recipient mobile stations or broadcast messages intended for multiple mobile stations.

SMS may be implemented by various types of wireless communication systems, two of which are code division multiple access (CDMA) systems and time division multiple access (TDMA) systems. A CDMA network may be designed to implement one or more standards such as cdma2000, W-CDMA, IS-95, and so on. A TDMA network may also be designed to implement one or more standards such as Global System for Mobile Communications (GSM). Each network typically further implement a particular mobile networking protocol that allows for roaming and advanced services, with ANSI-41 being commonly used for CDMA networks (except for W-CDMA) and GSM Mobile Application Part (GSM-MAP) being used for GSM and W-CDMA networks.

Since SMS is network technology dependent (ANSI-41 or MAP), CDMA and GSM networks that implement different network technologies support different implementations of SMS. Each SMS implementation has different capabilities and utilizes different message types and formats for sending short messages. Each SMS implementation may allow for different processing on short messages. For example, for the SMS implementation in GSM-MAP, the user data in a short message may be sent in a compressed or uncompressed form, with the compression algorithm being defined by a standard. For simplicity, the SMS implementation in GSM-MAP based networks is referred to as GSM SMS, and the SMS implementation in ANSI-41 based networks is referred to as CDMA SMS.

Although CDMA and GSM are quite different in design, an interworking and interoperability function (IIF) has been defined to allow for communication between these two different types of networks. The result is that improved coverage and performance may be attained for mobile users or subscribers of the networks. In particular, through the IIF, a GSM mobile user may roam into the coverage area of a CDMA network and can continue to receive service, and vice versa.

If the CDMA and GSM networks both support SMS, then one of the functions of the IIF is to convert each short message originated from one network into the proper format required by the other network prior to forwarding the message to the other network. However, because CDMA and GSM networks with different network technologies support different implementations of SMS, it may not be possible under the current standards for CDMA SMS and GSM SMS to convert a short message for one system into the specific format required by the other system. For example, since GSM SMS supports both compressed and uncompressed user data and CDMA SMS does not support the compressed format, the IIF would need to decompress the user data in a compressed GSM SMS message and then converts it to a CDMA SMS message. Moreover, the GSM SMS message may contain other fields that do not exist in the CDMA SMS message.

There is therefore a need in the art for techniques to convert GSM SMS messages to CDMA SMS messages, and vice versa, such that the problems described above are ameliorated.

SUMMARY

Techniques are provided herein for converting short messages between different formats used by different wireless communication systems (e.g., GSM SMS and CDMA SMS) such that pertinent control information is retained without changing the fundamental structure of these message formats. In an aspect, improved support for GSM SMS in a CDMA network can be achieved by defining a new value for a first designated field in a CDMA SMS message to indicate that the content of the CDMA SMS message is an encapsulated GSM SMS message. A second designated field in the CDMA SMS message may be used to carry the data coding scheme information for the encapsulated GSM SMS message. The first and second designated fields may respectively be the Msg_Encoding field and the Message_Type field in the User Data subparameter of the CDMA SMS message.

In one embodiment, a method is provided for converting a first short message in a first format (e.g., a GSM SMS message) to a second short message in a second format (e.g., a CDMA SMS message). In accordance with the method, a first field in the second message (e.g., the Msg_Encoding field) is set to a value indicative of a short message in the first format being included in the second message. A second field in the second message (e.g., the Message_Type field) is set to a value indicative of the data coding scheme used for the first message (e.g., which is indicated in the TP-Data-Coding-Scheme field in the GSM SMS message). A data field in the second message (e.g., the CHARi fields) is set to the data included in the first message. A length field in the second message (e.g., the Num_Fields field in the User Data subparameter) can also be set to a value indicative of the length of the data included in the first message (e.g., which is indicated by the TP-User-Data-Length field in the GSM SMS message).

In another embodiment, a method is provided for processing a received short message. In accordance with the method, a value in a first field in the received short message (e.g., the Msg_Encoding field in a CDMA SMS message) is obtained and used to determine whether or not the received short message includes an encapsulated message (e.g., a GSM SMS message). If the received short message includes an encapsulated message, then a value indicative of the data coding scheme used for the encapsulated message is obtained from a second field in the received short message (e.g., the Message_Type field), and the data in the received short message is then processed based on the data coding scheme. This processing may include decompressing the data in the received short message if the data coding scheme indicates that the data has been compressed. Alternatively, if the received short message does not include an encapsulated message, then the data in the received short message may be processed based on the value obtained from the first field.

Various aspects and embodiments of the invention are described in further detail below. The invention further provides methods, program codes, digital signal processors, mobile stations, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
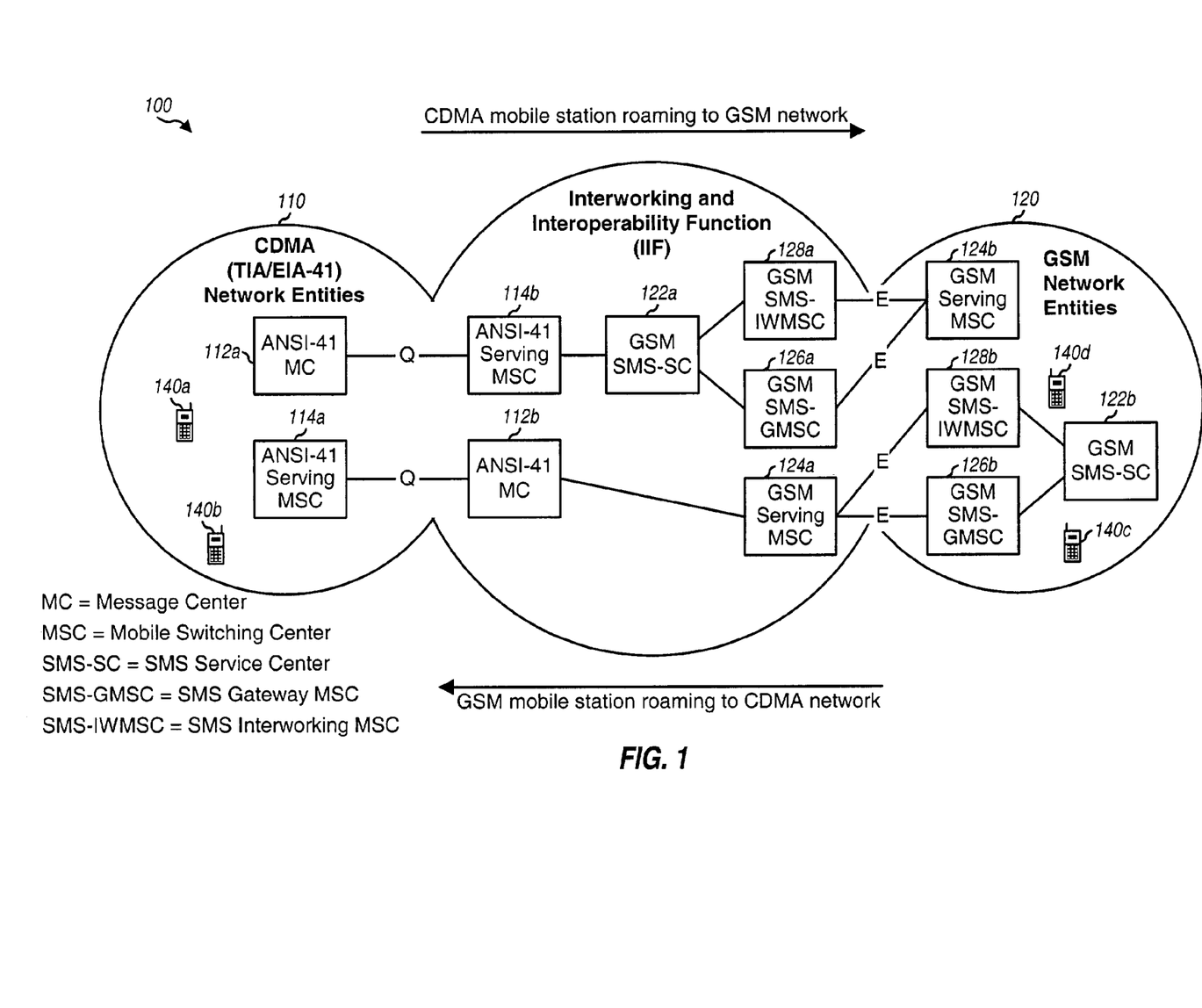
FIG. 1 is a diagram of a communication network that includes a CDMA network and a GSM network.

FIG. 1 is a diagram of a communication network 100 that includes a CDMA network 110 and a GSM network 120. An inter-working and interoperability function (IIF) supports communication between the CDMA and GSM networks.

The CDMA network may be designed to conform to ANSI-41, entitled "Cellular Radiotelecommunications Intersystem Operations", which is a mobile networking protocol that allows for roaming and advanced services. Roaming refers to the use of a mobile station away from the home area. The CDMA network includes a number of entities that collectively support communication for mobile stations 140 within the network. For simplicity, FIG. 1 only shows the CDMA network entities that support Short Message Service (SMS). In particular, message centers (MCs) 112 are responsible for storing, relaying, and forwarding short messages for mobile stations, and mobile switching centers (MSCs) 114 perform switching functions (i.e., routing of messages and data) for mobile stations within their coverage area. The message centers may be separate from or integrated with the MSCs. Each mobile station is served by one MSC at any given moment and this MSC is referred to as the mobile station's serving MSC. A mobile station is also referred to as a remote station, a terminal, user equipment (UE), or some other terminology.

The GSM network may be designed to conform to GSM Mobile Application Part (GSM-MAP), which is another mobile networking protocol that allows for roaming and advanced services. The GSM network includes a number of entities that collectively support communication for the mobile stations within the network, of which only the functional GSM network entities for SMS are shown in FIG. 1. GSM SMS service centers (GSM-SMS-SCs) 122 are responsible for storing, relaying, and forwarding short messages for mobile stations. GSM MSCs 124 perform the switching functions for mobile stations within their coverage areas. GSM SMS gateway MSC (GSM-SMS-GMSC) 126 is a function of the MSC capable of receiving short messages from the GSM-SMS-SC, interrogating a home location register (HLR) for routing information and SMS information for each short message, and delivering the short messages to the proper serving nodes (or base stations) for the mobile stations which are the intended recipient of these messages. GSM SMS interworking MSC (GSM-SMS-IWMSC) 128 is a function of the MSC capable of receiving short messages and submitting them to the GSM-SMS-SC.

For W-CDMA, the lower layers are based on CDMA technologies, the upper layer protocols are similar to those for GSM, and the core network is based on GSM-MAP. As used herein, "CDMA" refers to a CDMA-based system or network that implements ANSI-41.

The interface Q between the entities in the CDMA network and the interface E between the entities in the GSM network are defined by ANSI-41 and GSM-MAP, respectively.

To support mobile networking in accordance with ANSI-41 and GSM-MAP, each network maintains home location registers (HLRs) and visiting location registers (VLRs). The HLRs and VLRs are databases used to store information about the mobile stations in the network. For example, as the mobile stations move about and between the networks, their locations are continually updated in these databases so that the networks know their whereabouts at all times. These databases may then be consulted (or interrogated) by the network entities to obtain routing information for short messages.

As noted above, the CDMA and GSM networks support different implementations of SMS. Each SMS implementation provides different capabilities and utilizes different short message types and formats.

Figure 2A:
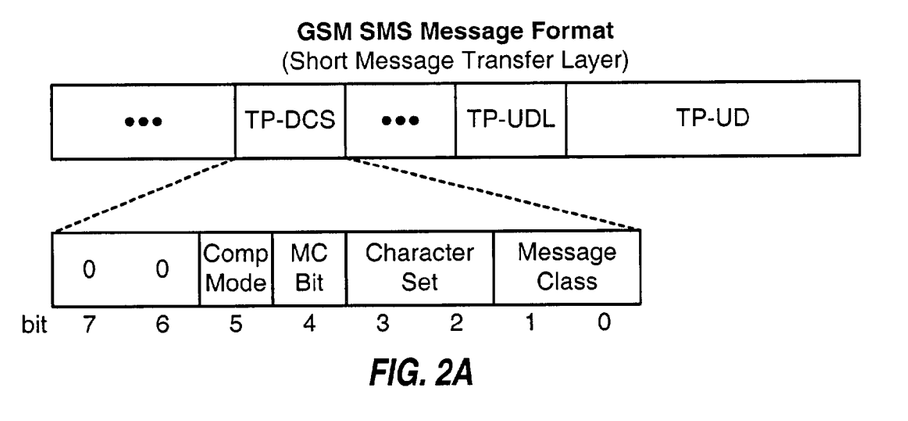
FIGS. 2A and 2B are diagrams illustrating a GSM SMS message format and a CDMA SMS message format, respectively.

FIG. 2A is a diagram illustrating a GSM SMS message format. At a Short Message Transfer Layer (SM-TL), which is one of the layers for the SMS protocol stack in GSM, six different protocol data units (PDUs) are defined for SMS messages. Of these, an SMS-DELIVER PDU is used to send a short message from the service center to the mobile station, and an SMS-SUBMIT PDU is used to send a short message from the mobile station to the service center. The other PDUs are used to convey status report, command, and acknowledgment.

The SMS-DELIVER and SMS-SUBMIT PDUs have the general format shown in FIG. 2A. Each of these two PDUs includes a number of fields, but only three fields of particular interest in the present description are shown in FIG. 2A. Table 1 lists these three fields and their short descriptions, where TP denotes Transfer Protocol.

TABLE 1

| Abbr. | Full Name | Length | Description |
| --- | --- | --- | --- |
| TP-DCS | TP-Data-Coding-Scheme | 8 bits | Parameter identifying the coding scheme within the TP-User-Data. |
| TP-UDL | TP-User-Data-Length | 8 bits | Parameter indicating the length of the TP-User-Data. |
| TP-UD | TP-User-Data | variable | User data for the short message. |

The TP-User-Data field contains the user data for the short message. This user data is typically an alpha-numeric message generated based on a particular character set or coding scheme. However, if User Data Headers are included in the TP-User-Data field, then the contents of the message may also be multimedia and other enhanced formats in addition to alpha-numeric content. The length of the TP-User-Data field is defined by the value in the TP-User-Data-Length field and is given in units corresponding to the length of each character for the selected character set, which may be 7, 8, or 16 bits. The TP-Data-Coding-Scheme field describes various attributes of the data in the TP-User-Data field and is described below.

Table 2 lists the elements of the TP-Data-Coding-Scheme field.

TABLE 2

| Bits | Description |
| --- | --- |
| 7–6 | Set to "00" for General Data Coding indication. |
| 5 | Set to "0" for uncompressed data in the TP-User-Data field.<br>Set to "1" for compressed data. |
| 4 | Set to "0" if bits 1-0 have no meaning.<br>Set to "1" if bits 1-0 are used to denote the message class. |
| 3–2 | Indicate the character set being used for the data in the TP-User-Data field<br>"00" = GSM 7-bit, default alphabet<br>"01" = 8-bit data<br>"10" = UCS2 (16-bit)<br>"11" = reserved. |
| 1–0 | Indicate the message class (if enabled by bit 4)<br>"00" = class 0<br>"01" = class 1, default meaning: ME-specific<br>"10" = class 2, (U)SIM specific message<br>"11" = class 3, default meaning: TE-specific. |

The TP-Data-Coding-Scheme field has a length of 8 bits. Bits 6 and 7 are set to "00" for the General Data Coding indication and to some other values for other indications. Bit 5 is used to indicate whether the data in the TP-User-Data field is uncompressed or compressed using a specified compression scheme. Bit 4 is used to "enable" bits 1-0. Bits 2 and 3 are used to indicate the character set or coding scheme used for the data, with the default character set being GSM 7-bit. Bits 0 and 1 are used to indicate the message class for the short message.

The GSM SMS message format is described in further detail in documents 3GPP TS 23.038 V5.0.0 and TS 23.040 V4.7.0, which are publicly available and incorporated herein by reference.

Figure 2B:
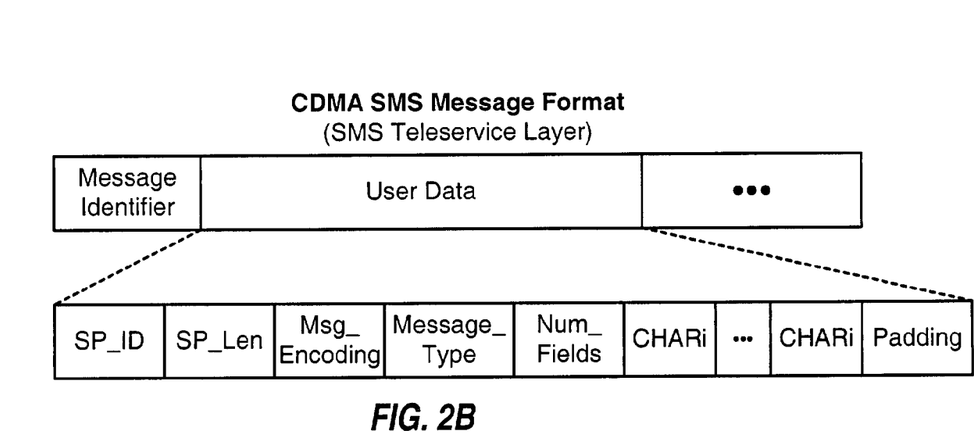

FIG. 2B is a diagram illustrating a CDMA SMS message format. At an SMS Teleservice Layer, which is one of the layers for the SMS protocol stack in CDMA, an SMS Deliver Message is used to send a short message to a mobile station and an SMS Submit Message is used to send a short message from the mobile station. These messages have the general format shown in FIG. 2B, which includes a number of subparameters. Table 3 lists the first two subparameters for these messages and their short descriptions.

TABLE 3

| Subparameter | Length | Description |
| --- | --- | --- |
| Message Identifier | 5 bytes | Include the message type and a message identification that may be used for acknowledgment. |
| User Data | variable | Include various attributes for the user data in the short message as well as the user data itself. |

Table 4 lists the fields of the User Data subparameter.

TABLE 4

| Field | Length | Description |
| --- | --- | --- |
| Subparameter_ID | 8 bits | Set to "00000001" for the User Data subparameter. |
| Subparam_Len | 8 bits | Indicate the length of the User Data subparameter, not including the Subparameter_ID and Subparam_Len fields. |
| Msg_Encoding | 5 bits | Indicate the coding scheme used for the user data in the short message. |
| Message_Type | 0 or 8 bits | Indicate the message type for the short message. |
| Num_Fields | 8 bits | Indicate the number of occurrences of the CHARi field, which typically corresponds to the number of characters in the user data. |
| Num_Fields occurrences of the following field: | | |
| CHARi | variable | Contain one character for the user data in either the CDMA SMS short message or an encapsulated GSM SMS TP-User-Data. |
| The User Data subparameter ends with the following field: | | |
| Padding | 0-7 bits | Include sufficient number of bits to make the User Data subparameter an integer number of octets in length. |

As shown in Table 4, the user data for the CDMA SMS message is contained in the CHARi fields, one occurrence of this field for each character, with the total number of occurrences being indicated by the value in the Num_Fields field. The Msg_Encoding field indicates the specific coding scheme used for the characters in the CHARi field. Since different coding schemes can have different character lengths, the length of the CHARi field is determined by the coding scheme used for the user data in the short message.

The CDMA SMS message format is described in further detail in TIA/EIA-637-B, entitled "Short Message Service for Wideband Spread Spectrum Systems." The assignment of the parameter values for the Msg_Encoding field is described in further detail in TSB-58-E, entitled "Administration of Parameter Value Assignments for cdma2000 Spread Spectrum Standards." Both of these documents are publicly available and incorporated herein by reference.

A GSM SMS message may need to be converted to a CDMA SMS message for various situations. For example, the message conversion may be needed when a GSM mobile user roams into a CDMA network and receives a short message in the CDMA network, or when a CDMA mobile user in a CDMA network receives a short message from a GSM mobile user. An inter-working and interoperability function (IIF) would then perform the conversion of the GSM SMS message to the CDMA SMS message.

From the above description, a "basic" uncompressed GSM SMS message may be converted into a CDMA SMS message by simply mapping the fields in the GSM SMS message to corresponding fields in the CDMA SMS message. In particular, the GSM to CDMA message conversion may be achieved by (1) mapping the data in the TP-User-Data field in the GSM SMS message to the CHARi fields in the User Data subparameter of the CDMA SMS message, and (2) setting the Msg_Encoding field in the User Data subparameter to "01001" for the GSM 7-bit default alphabet.

However, if the GSM SMS message has been compressed using the compression algorithm defined in 3GPP TS 23.042 V4.0.1, then the IIF would need to decompress the user data to obtain uncompressed data, which may then be included in the CHARi fields of the CDMA SMS message. This would be necessary since there are currently no fields in the CDMA SMS message format to indicate to the recipient mobile station whether the user data is compressed or uncompressed. In addition, as shown in Table 2 and FIG. 2A, the GSM SMS message format includes a message class and some other indications in the TP-Data-Coding-Scheme field. There are currently no corresponding fields in the CDMA SMS message format for these elements, which would also need to be mapped to more fully support GSM SMS in the CDMA network.

In an aspect, improved support for GSM SMS in the CDMA network can be achieved by defining a new value for the Msg_Encoding field in the User Data subparameter to indicate that the content of the CDMA SMS message is an encapsulated GSM SMS message. The Msg_Encoding field includes 5 bits for 32 possible values, of which 10 are currently defined by TSB-58-E for ten different coding schemes, which are assigned values of "00000" through "01001" for the Msg_Encoding field. Any one of the reserved values from "01010" through "11111" may then be used to identify a new coding scheme for the GSM SMS message. This new coding scheme may be denoted as "GSM SMS Data Encoding". As a specific example, the value "01010" may be used for "GSM SMS Data Encoding", in which case the coding schemes defined for use in the Msg_Encoding field of the User Data subparameter may be updated from the current TIA/EIA-637-B standard as shown in Table 5.

TABLE 5

| CHARi Encoding Type | Msg_Encoding Field | Length |
|---|---|---|
| . | . | . |
| . | . | . |
| . | . | . |
| GSM SMS Data Encoding (new) all other values are reserved | "01010" | Note 2 |

Note 2: The length of each CHARi field is determined by the character set indicated in the TP-Data-Coding-Scheme field, which will be included in the Message_Type field of the CDMA SMS message.

Figure 3:
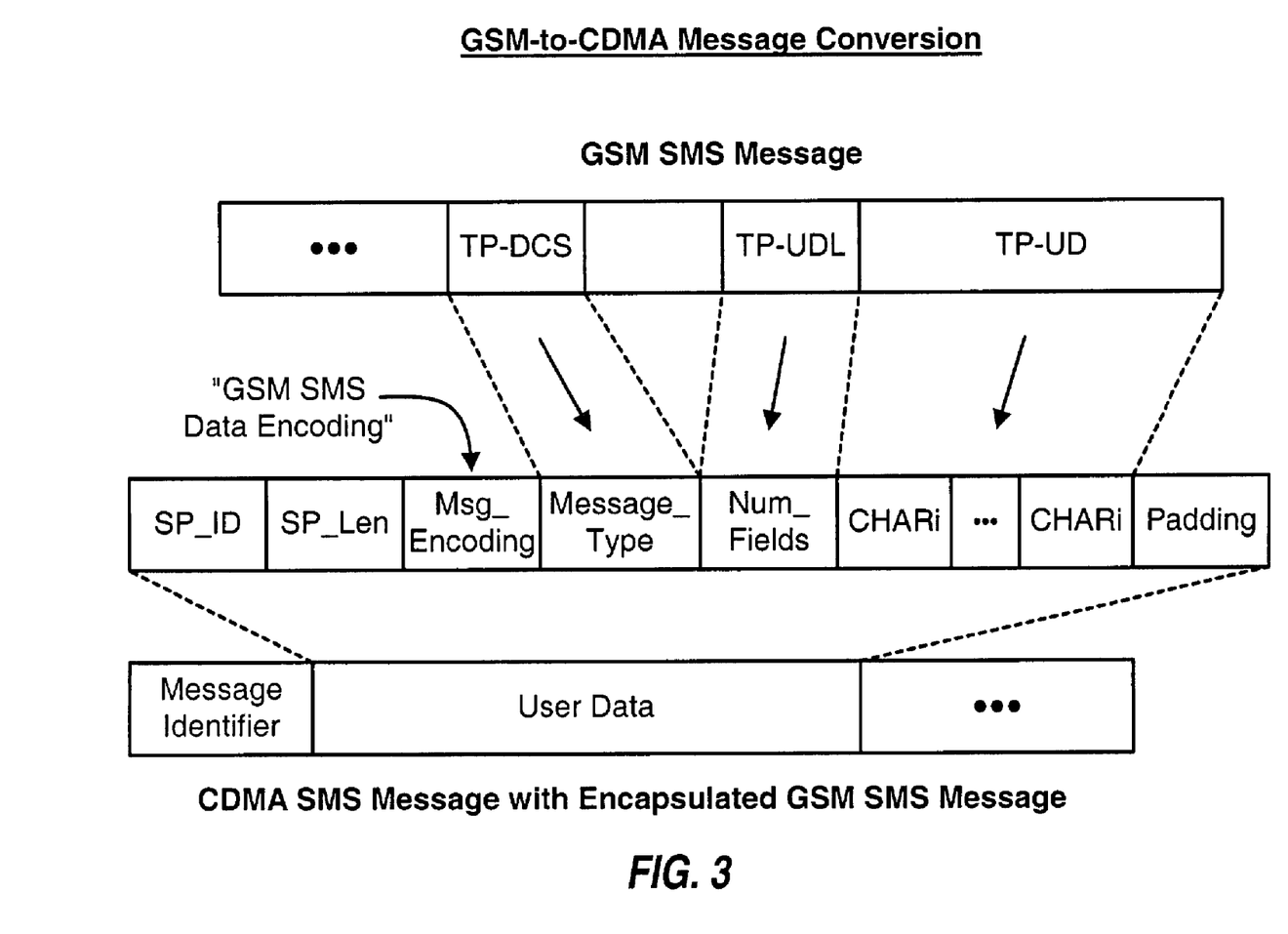
FIG. 3 is a diagram illustrating the conversion of a GSM SMS message to a CDMA SMS message.

FIG. 3 is a diagram illustrating an embodiment of the conversion of a GSM SMS message to a CDMA SMS message such that pertinent control information is retained. The GSM-to-CDMA message conversion may be performed as follows:

1) Set the Msg_Encoding field in the User Data subparameter of the CDMA SMS message to the value assigned to "GSM SMS Data Coding" (e.g., "01010" for the above example parameter value assignment);
2) Set the Message_Type field in the User Data subparameter to the value in the TP-Data-Coding-Scheme (TP-DCS) field of the GSM SMS message;
3) Set the Num_Fields field in the User Data subparameter to the value in the TP-User-Data-Length (TP-UDL) field; and
4) Set the CHARi fields in the User Data subparameter to the data in the TP-User-Data (TP-UD) field.

CDMA SMS messages may also be sent to mobile users in a GSM network using the features supported by GSM SMS. To achieve this, the CDMA network can originate a CDMA SMS message that includes a GSM SMS message encapsulated as described above. The IIF would then perform a complementary CDMA-to-GSM message conversion to convert the CDMA SMS message to a GSM SMS message, as follows:

1) Set the TP-Data-Coding-Scheme (TP-DCS) field of the GSM SMS message to the value in the Message_Type field in the User Data subparameter of the CDMA SMS message;
2) Set the TP-User-Data-Length (TP-UDL) field to the value in the Num_Fields field in the User Data subparameter; and
3) Set the TP-User-Data (TP-UD) field to the data in the CHARi fields in the User Data subparameter.

FIG. 3 shows a specific message conversion scheme for mapping a GSM SMS message to a CDMA SMS message such that pertinent control information is retained without altering the CDMA SMS message format. Other schemes may also be implemented based on the teachings described herein and would be within the scope of the invention. As one example, a value (e.g., "0111") not currently used for the Message_Type field in the Message Identifier subparameter may be used to indicate "GSM SMS Data Coding". Other fields in other subparameters of the CDMA SMS message may also be used to indicate "GSM SMS Data Coding" and to carry the TP-DCS field, and this is within the scope of the invention.

The message conversion schemes described above can map the SMS data coding scheme defined by GSM/UMTS to a CDMA SMS message without changing the fundamental structure of the CDMA SMS message format. By using these message conversion schemes, the IIF can perform direct mapping of the user data in GSM SMS messages to CDMA SMS messages even if compression is used for the user data and/or some other indications are included in the GSM SMS messages. These message conversion schemes can be advantageously used for various situations including: (1) a GSM mobile user roaming into a CDMA network and receiving an SMS message originated from the GSM network, (2) a GSM mobile user sending an SMS message to a CDMA mobile user, (3) a CDMA mobile user roaming into a GSM network and, receiving an SMS message originated from the CDMA network, (4) a CDMA mobile user sending an SMS message to a GSM mobile user, and (5) a GSM mobile user in a GSM1x network receives a GSM SMS message via CDMA air interface. In the GSM1x network, a GSM-MAP network is overlaid over the CDMA air interface and GSM SMS messages are sent via the CDMA air interface in the form of CDMA SMS messages.

Figure 4:
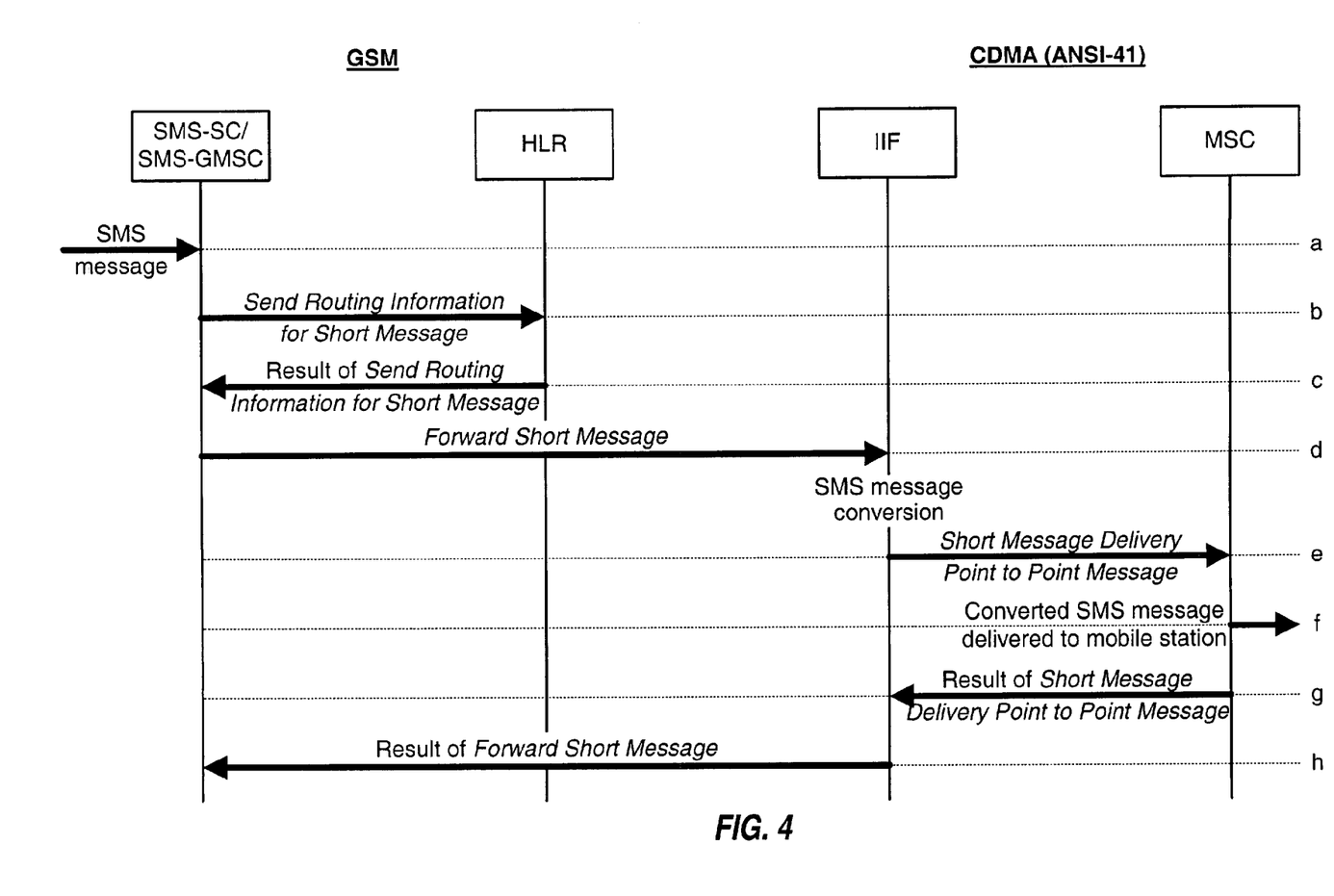
FIG. 4 is a diagram illustrating the signal flow for sending an SMS message from the GSM network to a recipient mobile user in the CDMA network.

FIG. 4 is a diagram illustrating the signal flow for sending an SMS message from a GSM network to a recipient mobile user in a CDMA network. This SMS message may be sent by a GSM mobile user or a CDMA mobile user who has roamed into the GSM network. The message recipient may be a CDMA mobile user or a GSM mobile user who has roamed into the CDMA network.

Initially, a GSM SMS service center (SMS-SC) receives an SMS message for a specific mobile user, who is referred to as the recipient mobile user (transaction a). The SMS-SC then communicates with a GSM SMS-GMSC to originate a Send Routing Information for Short Message to the GSM HLR of the recipient mobile user to request for a routing address for this mobile user (transaction b). This routing address will be used to deliver the short message to the recipient mobile user. If the recipient mobile user has a current and valid location stored in the GSM HLR, then the HLR returns it to the SMS-GMSC via a Send Routing Information for Short Message Result message (transaction c). The SMS-GMSC then sends a Forward Short Message to the IIF (transaction d).

In general, the IIF provides an interface from the CDMA SMS (ANSI-41) message center (MC) and the GSM SMS service center (SMS-SC) to a serving MSC that uses a foreign network signaling protocol (i.e., foreign to the message center and service center). The functionality provided by the IIF is described in detail in J-STD-038-A, entitled "Network Interworking Between GSM Map and TIA/EIA-41-Map-Revision A—GPRS Support," which is publicly available and incorporated herein by reference.

For this SMS message, the IIF is seen by the GSM network entities as the serving GSM MSC/VLR. Upon receiving the Forward Short Message from the SMS-GMSC, the IIF converts the SMS message using the GSM-to-CDMA message conversion scheme described above. The result of the conversion is a CDMA SMS message in the proper CDMA SMS message format and including an encapsulated message. At this point, the IIF would then be acting as an ANSI-41 message center. The IIF then originates a Short Message Delivery Point to Point message to send the converted CDMA SMS message to the serving CDMA MSC and VLR (transaction e).

The serving CDMA MSC/VLR receives the message from the IIF and sends the CDMA SMS message to the recipient mobile station (transaction f). For certain types of SMS message, the serving CDMA MSC/VLR may receive an acknowledgement from the recipient mobile station, which would then be part of transaction f. In that case, the serving CDMA MSC/VLR then sends the result of the Short Message Delivery Point to Point message back to the IIF (transaction g). The IIF then sends the result of the Forward Short Message to the GSM SMS-GMSC.

Figure 5:
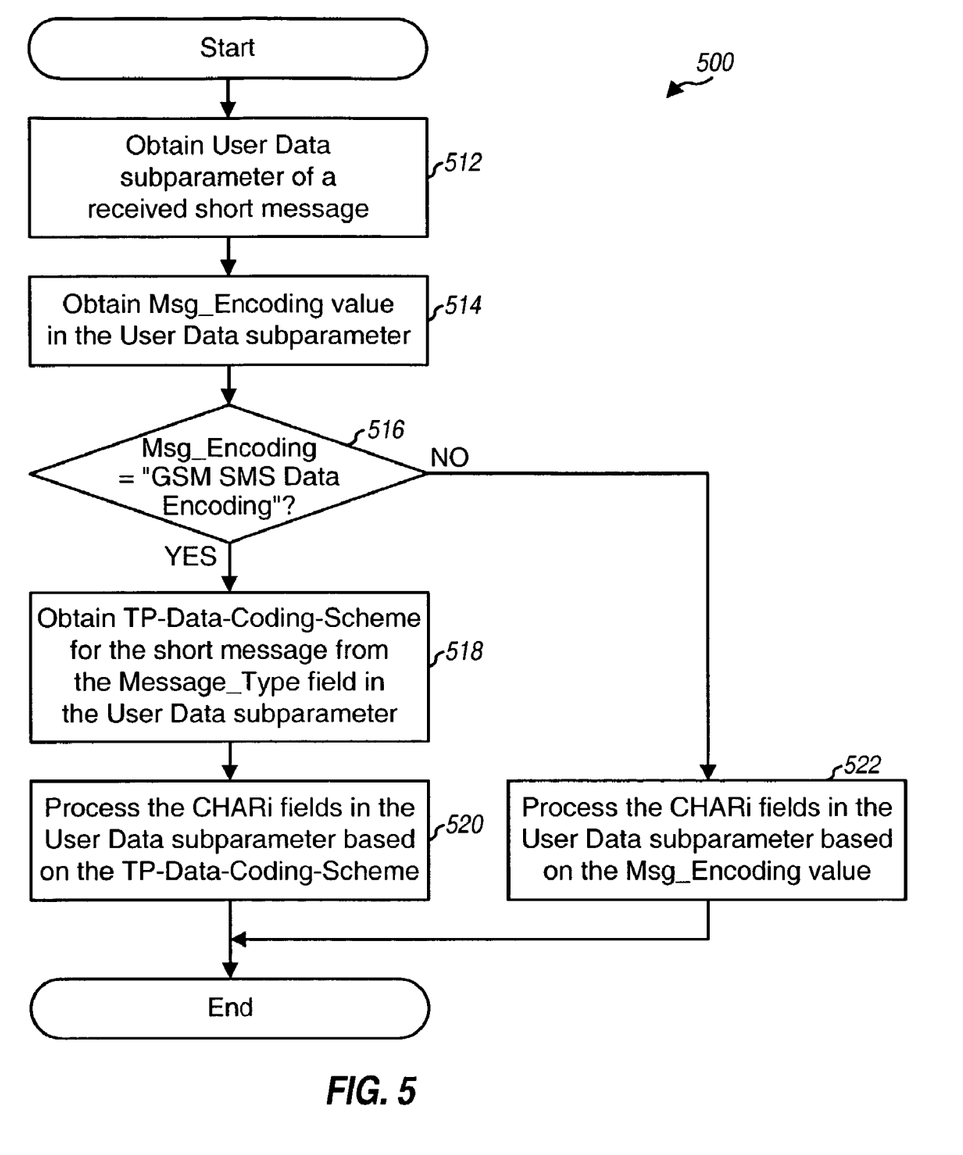
FIG. 5 is a flow diagram of a process performed for a received short message by a mobile station in the CDMA network.

FIG. 5 is a flow diagram of an embodiment of a process 500 performed for a received short message by a mobile station in a CDMA network. This process assumes that the short messages are converted, if necessary, using the GSM-to-CDMA message conversion scheme described above.

Initially, the User Data subparameter of the received short message is obtained (step 512). The value in the Msg_Encoding field of the User Data subparameter is then obtained (step 514). A determination is next made whether or not the Msg_Encoding value is equal to the value assigned to "GSM SMS Data Encoding" (step 516). If the answer is no, then this received message is either a CDMA SMS message or one that does not require handling for an encapsulated GSM SMS message. In that case, the user data in the CHARi fields of the User Data subparameter are processed in the normal manner based on the Msg_Encoding value (step 522).

However, if the Msg_Encoding value is equal to the "GSM SMS Data Encoding" value, as determined in step 516, then the received short message includes an encapsulated GSM SMS message. In that case, the TP-Data-Coding-Scheme for the SMS message is obtained from the Message_Type field in the User Data subparameter (step 518). The user data in the CHARi fields of the User Data subparameter, which contain the TP-User-Data for the short message, is then processed based on the TP-Data-Coding-Scheme (step 520). As part of this processing, the user data may be decompressed if the TP-Data-Coding-Scheme indicates that the data has been compressed prior to transmission. The processing of the user data in the short message may be performed as described in 3GPP TS 23.038 V5.0.0. After steps 520 and 522, the process terminates.

Figure 6:
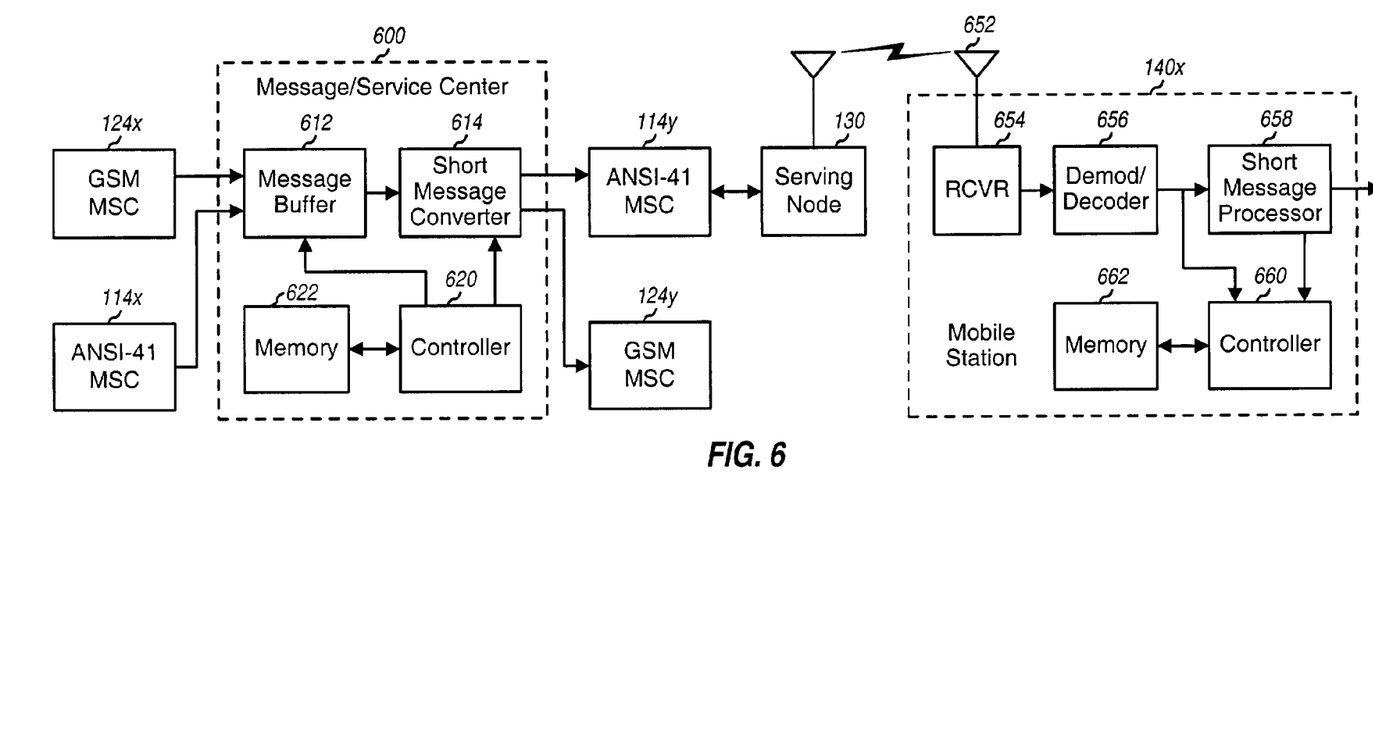
FIG. 6 is a block diagram of an embodiment of a message/service center and a mobile station.

FIG. 6 is a block diagram of an embodiment of a message/service center 600 and a mobile station 140x. Message/service center 600 provides interworking and interoperability function (IIF) for SMS and may be implemented, for example, in either an ANSI-41 message center or a GSM SMS service center.

Center 600 receives SMS messages originated from GSM MSCs 124 and/or CDMA MSCs 114 to be sent from foreign networks. The received short messages are temporarily stored in a message buffer 612. These short messages are thereafter retrieved from the buffer and provided to a short message converter 614 for conversion to the proper format, if necessary. In particular, short message converter 614 performs GSM-to-CDMA message conversion for GSM SMS messages to be transmitted from the CDMA network, and CDMA-to-GSM message conversion for CDMA SMS messages to be transmitted from the GSM network. The message conversion may be performed as described above.

The converted short messages are then provided to serving CDMA MSCs 114 and/or GSM MSCs 124 of the foreign networks. The serving MSCs then forward the converted short messages to the serving nodes (or base stations) 130 currently serving the mobile stations which are the intended recipients of these messages. Each serving node processes the received short messages and includes them in a modulated signal transmitted to the mobile stations within its coverage area.

Within center 600, a controller 620 directs the flow of the short messages through the center and further controls the conversion of the short messages, as appropriate. This can be achieved by determining the source and recipient of each short message received by center 600. A memory unit 622 provides storage for program codes and data used by controller 620.

FIG. 6 also shows an embodiment of mobile station 140x. The modulated signal transmitted from the serving node of the mobile station is received by an antenna 652 and provided to a receiver unit (RCVR) 654. Receiver unit 654 conditions (e.g., filters, amplifies, and downconverts) the received signal and further digitizes the conditioned signal to provide samples.

A demodulator (Demod)/decoder 656 then demodulates the samples in a particular manner determined by the specific network (CDMA or GSM) from which the modulated signal was received. The demodulated data is then decoded to provide decoded data, which includes short messages sent in the modulated signal. A short message processor 658 then processes the received short messages (e.g., as described above in FIG. 5) to provide the user data included in these short messages. For example, short message processor 658 may perform message conversion and possibly decompression of the user data in the CHARi fields of the User Data subparameter, if the TP-Data-Coding-Scheme indicates that compressed data is included in the short message.

A controller 660 directs the operation of the units within mobile station 140x. For example, controller 660 may direct short message processor 658 to use a specific coding scheme, perform decompression, and so on, for each received short message intended for the mobile station, to provide correct user data. A memory unit 662 provides storage for program codes and data used by controller 660.

FIG. 6 shows a specific embodiment of center 600 and mobile station 140x. Other embodiments are also possible and are within the scope of the invention. For center 600, short message converter 614 may also be implemented within controller 620 or within some other processing unit (e.g., a message formatter). Similarly, for mobile station 140x, short message processor 658 may be implemented within controller 660 or within some other processing unit (e.g., demodulator/decoder 656).

The short message conversion and processing techniques described herein may be implemented by various means. For example, these techniques may be implemented in hardware, software, or a combination thereof. For a hardware implementation, the elements used to implement any one or a combination of the techniques described herein (e.g., the message conversion at center 600, the message processing at mobile station 140, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the short message conversion and processing techniques may be implemented with modules (e.g., procedures, functions, and so on) that perform the functions described herein. The software codes may be stored in a memory unit (e.g., memory units 622 and 662 in FIG. 6) and executed by a processor (e.g., controllers 620 and 660). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, a method for converting a first short message in a first format to a second short message in a second format, comprising:
    setting a first field in the second message to a value indicative of a short message originally in the first format being included in the second message;
    setting a second field in the second message to a value indicative of a data coding scheme used for the first message;
    setting a data field in the second message to data included in the first message; and
    defining a new value for said first field, wherein said new value indicates a value indicative of a short message originally in the first format being included in the second message, wherein the first short message is a GSM SMS message and the second short message is a CDMA SMS message and the second field is a Message_Type field in a User Data subparameter of the CDMA SMS message.

2. The method of claim 1, wherein the Message_type field is set to the data coding scheme indicated in a TP-Data-Coding-Scheme field of the first message.

3. In a wireless communication system, a method for converting a CDMA SMS message to a GSM SMS message, comprising:
    setting a TP-Data-Coding-Scheme field in the GSM SMS message to a value in a designated field in the CDMA SMS message and indicative of a data coding scheme used for the GSM SMS message; and
    setting a TP-User-Data field in the GSM SMS message to data in CHARi fields in the CDMA SMS message,
    wherein the designated field is a Message_type field in a User Data subparameter of the CDMA SMS message.

4. A method for processing a received short message in a wireless communication system, comprising:
    obtaining a value in a first field in the received short message;
    determining whether or not the received short message includes an encapsulated message based on the value obtained from the first field; and
    if the received short message includes an encapsulated message,
    obtaining from a second field in the received short message a value indicative of a data coding scheme used for the encapsulated message, and
    processing data in the received short message based on the data coding scheme;
    wherein the received short message is a CDMA SMS message and the encapsulated message is a GSM SMS message; and
    wherein the first field is a Msg Encoding field and the second field is a Message Type field in a User Data subparameter of the CDMA SMS message.

5. The method of claim 4, wherein the processing includes decompressing the data in the received short message if the data coding scheme indicates that the data has been compressed.

6. The method of claim 4, further comprising:
    if the received short message does not include an encapsulated message,
    processing the data in the received short message based on the value obtained from the first field.

7. An apparatus in a wireless communication system and operable to convert a first short message in a first format to a second short message in a second format, comprising:
    means for setting a first field in the second message to a value indicative of a short message originally in the first format being included in the second message;
    means for setting a second field in the second message to a value indicative of a data coding scheme used for the first message;
    means for setting a data field in the second message to data included in the first message; and
    means for defining a new value for said first field, wherein said new value indicates a value indicative of a short message originally in the first format being included in the second message, wherein the first short message is a GSM SMS message and the second short message is a CDMA SMS message and the second field is a Message_Type field in a User Data subparameter of the CDMA SMS message.

8. The apparatus of claim 7, wherein the Message_Type field is set to the data coding scheme indicated in a TP-Data-Coding-Scheme field of the first message.

9. An apparatus in a wireless communication system and operable to process a received short message, comprising:
    means for obtaining a value in a first field in the received short message;
    means for determining whether or not the received short message includes an encapsulated message based on the value obtained from the first field; and
    means for obtaining from a second field in the received short message a value indicative of a data coding scheme used for the encapsulated message, if the received short message includes an encapsulated message; and means for processing data in the received short message based on the data coding scheme, if the received short message includes an encapsulated message;

wherein the received short message is a CDMA SMS message and the encapsulated message is a GSM SMS message; and wherein the first field is a Msg Encoding field and the second field is a Message_Type field in a User Data subparameter of the CDMA SMS message.

10. The apparatus of claim 9, further comprising:

means for decompressing the data in the received short message if the data coding scheme indicates that the data has been compressed.

11. The apparatus of claim 9, further comprising:

means for processing the data in the received short message based on the value obtained from the first field, if the received short message does not include an encapsulated message.

* * * * *